United States Patent
Sato

(10) Patent No.: US 11,673,559 B2
(45) Date of Patent: Jun. 13, 2023

(54) DISEMBARKATION ACTION DETERMINATION DEVICE, VEHICLE, DISEMBARKATION ACTION DETERMINATION METHOD, AND NON-TRANSITORY STORAGE MEDIUM STORED WITH PROGRAM

(71) Applicant: TOYOTA JIDOSHA KABUSHIKI KAISHA, Toyota (JP)

(72) Inventor: Arata Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/453,665

(22) Filed: Nov. 5, 2021

(65) Prior Publication Data

US 2022/0194386 A1 Jun. 23, 2022

(30) Foreign Application Priority Data

Dec. 22, 2020 (JP) .............................. JP2020-212505

(51) Int. Cl.
 *G08B 23/00* (2006.01)
 *B60W 40/08* (2012.01)
 (Continued)

(52) U.S. Cl.
 CPC .............. *B60W 40/08* (2013.01); *B60N 2/002* (2013.01); *B60W 40/105* (2013.01);
 (Continued)

(58) Field of Classification Search
 CPC .... B60W 40/08; B60W 40/105; B60W 50/14; B60W 2040/0881; B60W 2050/143;
 (Continued)

(56) References Cited

U.S. PATENT DOCUMENTS 10,549,696 B2 * 2/2020 Inoue ..................... H04N 7/188
11,292,342 B1 * 4/2022 Ignaczak ................ B60K 35/00
(Continued)

FOREIGN PATENT DOCUMENTS

| JP | 2018-160135 A | 10/2018 |
| JP | 2019-121028 A | 7/2019 |
| JP | 2020-078959 A | 5/2020 |

OTHER PUBLICATIONS

"The new Mercedes-Benz S-Class Under the microscope: MBUX Interior Assist", Mercedes-Benz Midtown Toronto, 2021, 3 pages, https://www.mercedes-benz-midtown-toronto.ca/the-new-mercedes-benz-s-class/.

*Primary Examiner* — Anh V La
(74) *Attorney, Agent, or Firm* — Oblon, McClelland, Maier & Neustadt, L.L.P.

(57) ABSTRACT

A disembarkation action determination device includes: an upper body movement detection section configured to detect for a first state in which an upper body of an occupant sitting on a vehicle seat has been lifted upright, based on a signal from a first sensor provided inside a vehicle cabin; a hand position detection section configured to detect for a second state in which a hand of the occupant sitting on the vehicle seat is in proximity to or contacting a door inside handle, based on a signal either from the first sensor or from a second sensor separate from the first sensor; and a disembarkation action determination section configured to determine that the occupant has initiated a disembarkation action in cases in which the first state has been detected by the upper body movement detection section and the second state has been detected by the hand position detection section.

10 Claims, 6 Drawing Sheets

(51) Int. Cl.
*B60W 40/105* (2012.01)
*B60W 50/14* (2020.01)
*B60N 2/00* (2006.01)
*G06V 20/58* (2022.01)
*G06V 20/59* (2022.01)
*G06V 40/20* (2022.01)
*G06V 40/10* (2022.01)

(52) U.S. Cl.
CPC .......... *B60W 50/14* (2013.01); *G06V 20/58* (2022.01); *G06V 20/593* (2022.01); *G06V 40/107* (2022.01); *G06V 40/28* (2022.01); *B60W 2040/0881* (2013.01); *B60W 2050/143* (2013.01); *B60W 2540/223* (2020.02); *B60W 2540/225* (2020.02)

(58) Field of Classification Search
CPC ...... B60W 2540/223; B60W 2540/225; B60N 2/002; G06V 20/58; G06V 20/593; G06V 40/107; G06V 40/28; G06V 20/59; G06V 40/103; G06V 40/18; B60Q 9/008; B60Q 9/00; B60R 16/023; B60R 16/037
USPC ........ 340/573.1, 686.1, 686.6, 426.28, 425.5
See application file for complete search history.

(56) References Cited

U.S. PATENT DOCUMENTS

| | | | |
|---|---|---|---|
| 2013/0088578 A1* | 4/2013 | Umezawa | G08G 1/166 348/47 |
| 2016/0023600 A1* | 1/2016 | Okamoto | B60Q 9/00 340/435 |
| 2019/0139411 A1* | 5/2019 | Dhull | B60N 2/002 |
| 2019/0255972 A1* | 8/2019 | Breitweg | B60N 2/0248 |
| 2020/0148108 A1 | 5/2020 | Kumashiro et al. | |
| 2020/0180538 A1* | 6/2020 | Gonzalez Laurel | B60R 21/36 |

\* cited by examiner

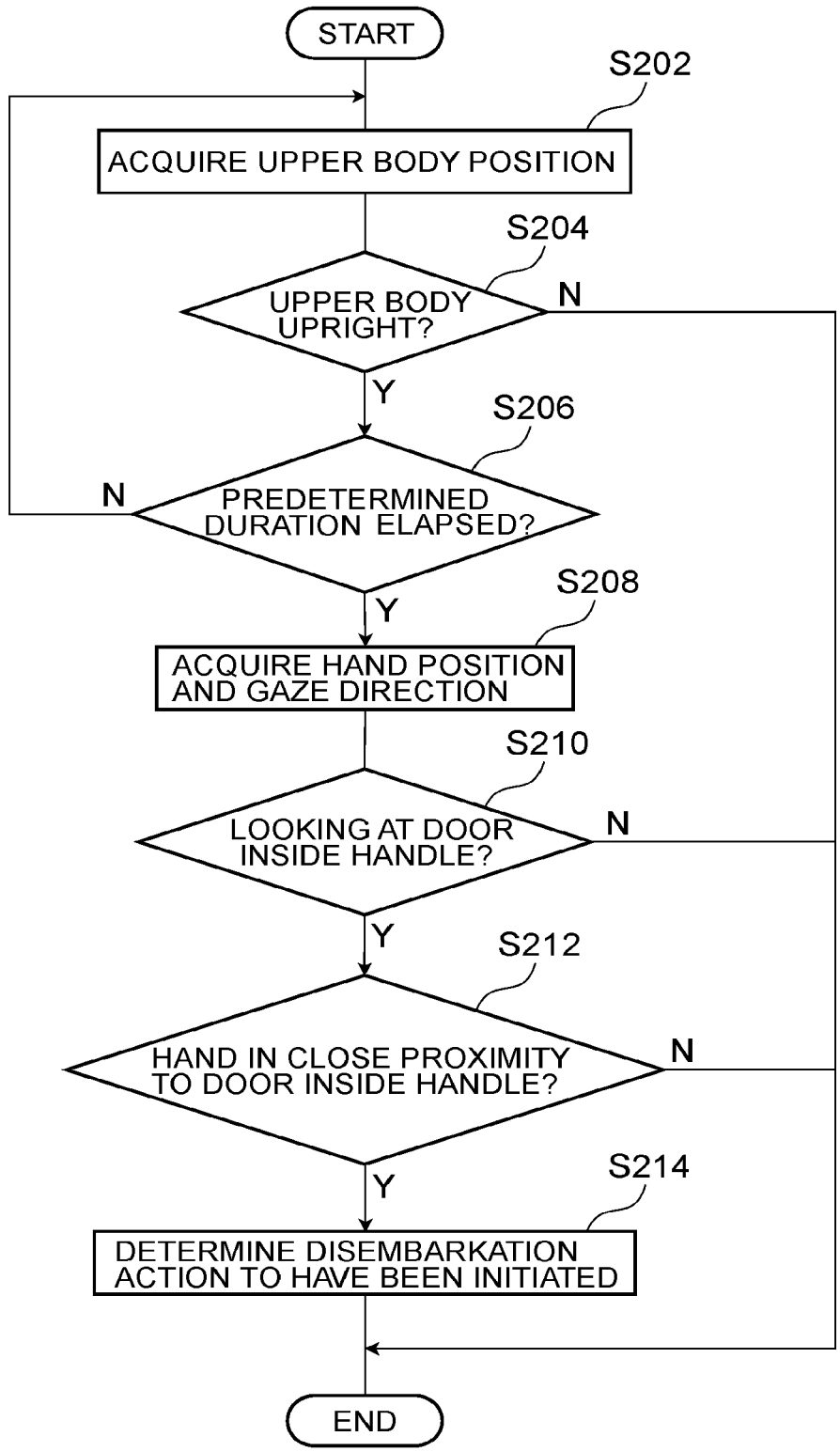

DISEMBARKATION ACTION DETERMINATION DEVICE, VEHICLE, DISEMBARKATION ACTION DETERMINATION METHOD, AND NON-TRANSITORY STORAGE MEDIUM STORED WITH PROGRAM

CROSS-REFERENCE TO RELATED APPLICATION

This application is based on and claims priority under 35 USC 119 from Japanese Patent Application No. 2020-212505 filed on Dec. 22, 2020, the disclosure of which is incorporated by reference herein.

BACKGROUND

Technical Field

The present disclosure relates to a disembarkation action determination device, a vehicle, a disembarkation action determination method, and a non-transitory storage medium stored with a program.

Related Art

Japanese Patent Application Laid-Open (JP-A) No. 2018-160135 discloses a disembarkation warning device that makes an announcement inside or outside a vehicle when a passenger is disembarking from the vehicle. Specifically, in the disembarkation warning device disclosed in JP-A No. 2018-160135, a warning is given by outputting an audio message to the passenger when the vehicle is in a parked state.

However, the device disclosed in JP-A No. 2018-160135 is unable to detect when an occupant has initiated a disembarkation action. Thus, the warning may also be given in cases in which an occupant does not intend to disembark, which may become annoying.

SUMMARY

The present disclosure provides a disembarkation action determination device, a vehicle, a disembarkation action determination method, and a non-transitory storage medium stored with a program that are capable of prompting care to be taken during disembarkation from a vehicle, while ensuring a pleasant environment for occupants.

A first aspect of the present disclosure is a disembarkation action determination device including: an upper body movement detection section configured to detect for a first state in which an upper body of an occupant sitting on a vehicle seat has been lifted upright, based on a signal from a first sensor provided inside a vehicle cabin; a hand position detection section configured to detect for a second state in which a hand of the occupant sitting on the vehicle seat is in proximity to or contacting a door inside handle, based on a signal either from the first sensor or from a second sensor separate from the first sensor; and a disembarkation action determination section configured to determine that the occupant has initiated a disembarkation action in cases in which the first state has been detected by the upper body movement detection section and the second state has been detected by the hand position detection section.

In the disembarkation action determination device of the first aspect, the upper body movement detection section detects for the first state in which the upper body of the occupant has been lifted upright, based on the signal from the first sensor provided inside the vehicle cabin. The hand position detection section detects for the second state in which the hand of the occupant sitting on the vehicle seat is in proximity to or contacting the door inside handle, based on the signal from either the first sensor or the second sensor. The disembarkation action determination section determines the occupant to have initiated a disembarkation action in cases in which the first state and the second state have both been detected. This enables the disembarkation action of the occupant to be detected prior to the occupant opening the door.

Moreover, since the disembarkation action is not determined until both the first state and the second state have been detected, warnings at unnecessary timings, such as when the vehicle has simply stopped, can be suppressed. Note that the "disembarkation action" referred to herein is a broad concept not limited to an action to open a side door, and also includes actions taken prior to opening the side door. Namely, the "disembarkation action" includes transitional actions such as shifting from a traveling posture adopted during vehicle travel to a posture adopted in order to open the side door.

In a second aspect of the present disclosure, in the first aspect, the disembarkation action determination section may determine that the occupant has initiated the disembarkation action in cases in which the second state has been detected by the hand position detection section after a predetermined duration has elapsed following detection of the first state by the upper body movement detection section.

In the disembarkation action determination device of the second aspect, the disembarkation action is not determined to have been initiated in cases in which the first state and the second state are detected at the same time. It is known that when disembarking, occupants will often touch the door inside handle with their hand after first lifting their upper body upright. Thus, basing determination that a disembarkation action has been initiated on the configuration described above enables instances of mistaken determination to be reduced. MOM In a third aspect of the present disclosure, in the first aspect or the second aspect, the disembarkation action determination section may perform the determination regarding initiation of a disembarkation action in cases in which a vehicle speed of the vehicle has become zero.

In the disembarkation action determination device of the third aspect, taking the vehicle speed into consideration enables determination that a disembarkation action has been initiated to be made more accurately. Moreover, the processing burden can be reduced in comparison to configurations in which determination regarding a disembarkation action is being performed at all times.

A fourth aspect of the present disclosure, in any one of the first aspect to the third aspect, may further include a gaze direction acquisition section configured to acquire a gaze direction of the occupant, wherein: the disembarkation action determination section determines the occupant to have initiated the disembarkation action in cases in which the first state and the second state have been detected, and the gaze direction acquisition section has detected that the gaze direction of the occupant is directed toward the door inside handle.

In the disembarkation action determination device of the fourth aspect, since determination that a disembarkation action has been initiated is only made in cases in which the gaze direction of the occupant is directed toward the door inside handle, instances of mistaken determination may be reduced in comparison to configurations in which the gaze direction is not detected.

In a fifth aspect of the present disclosure, in any one of the first aspect to the fourth aspect, the upper body movement detection section may be configured to detect for the first state based on load distribution using a seat load sensor serving as the first sensor and installed at the vehicle seat.

In the disembarkation action determination device of the fifth aspect, detection that the upper body is upright is made based on load distribution, using the seat load sensor. This enables detection of the first state to be made in for example cases in which the load distribution has changed from a load distribution corresponding to a relaxed posture to a load distribution corresponding to a posture in which the upper body has been lifted upright.

In a sixth aspect of the present disclosure, in any one of the first aspect to the fifth aspect, the hand position detection section may be configured to detect for the second state based on a signal from a proximity sensor serving as the second sensor and provided peripherally to the door inside handle.

In the disembarkation action determination device of the sixth aspect, detection of the second state is made based on a signal from the proximity sensor provided peripherally to the door inside handle, thereby enabling the second state to be more accurately detected than in configurations in which sensing is performed from a position some distance from the door inside handle.

In a seventh aspect of the present disclosure, in any one of the first aspect to the fourth aspect, the upper body movement detection section and the hand position detection section may be configured to detect for the first state and the second state based on an image of the occupant captured by an in-cabin camera serving as the first sensor.

In the disembarkation action determination device of the seventh aspect, the first state and the second state are both detected based on images of the occupant captured by the in-cabin camera, thereby enabling a disembarkation action of the occupant to be determined without employing other types of sensor.

A vehicle of an eighth aspect includes the disembarkation action determination device of any one of the first aspect to the seventh aspect.

A ninth aspect of the present disclosure, in the eighth aspect, may further include: an obstacle detection section configured to detect for obstacles in a periphery of the vehicle; and a reporting unit configured to issue a notification to the occupant, wherein a predetermined notification is issued to the occupant by the reporting unit in cases in which the disembarkation action determination section has determined that the occupant has initiated a disembarkation action and an obstacle has been detected in the vehicle periphery by the obstacle detection section.

In the vehicle of the ninth aspect, in cases in which the occupant is determined to have initiated a disembarkation action and an obstacle has been detected in the vehicle periphery, a predetermined notification is made to the occupant using the reporting unit, thereby enabling the occupant to be warned prior to the occupant opening the door.

A tenth aspect of the present disclosure is a disembarkation action determination method including: detecting for a first state in which an upper body of an occupant sitting on a vehicle seat has been lifted upright, based on a signal from a first sensor provided inside a vehicle cabin; detecting for a second state in which a hand of the occupant sitting on the vehicle seat is in proximity to or contacting a door inside handle, based on a signal either from the first sensor or from a second sensor separate from the first sensor; and determining the occupant to have initiated a disembarkation action in cases in which the first state has been detected and the second state has been detected.

An eleventh aspect of the present disclosure is a non-transitory storage medium storing a program executable by a computer to perform processing, the processing including: detecting for a first state in which an upper body of an occupant sitting on a vehicle seat has been lifted upright, based on a signal from a first sensor provided inside a vehicle cabin; detecting for a second state in which a hand of the occupant sitting on the vehicle seat is in proximity to or contacting a door inside handle, based on a signal either from the first sensor or from a second sensor separate from the first sensor; and determining the occupant to have initiated a disembarkation action in cases in which the first state has been detected and the second state has been detected.

As described above, the disembarkation action determination device, vehicle, disembarkation action determination method, and non-transitory storage medium stored with a program according to the present disclosure are capable of prompting care to be taken during disembarkation from a vehicle, while ensuring a pleasant environment for occupants.

BRIEF DESCRIPTION OF THE DRAWINGS

Exemplary embodiment of the present disclosure will be described in detail based on the following figures, wherein:

FIG. 6 is a flowchart illustrating an example of a flow of disembarkation action determination processing according to the second exemplary embodiment.

DETAILED DESCRIPTION

First Exemplary Embodiment

Explanation follows regarding a disembarkation action determination device 10 according to a first exemplary embodiment, with reference to the drawings.

Hardware Configuration of Vehicle 12

Figure 1:
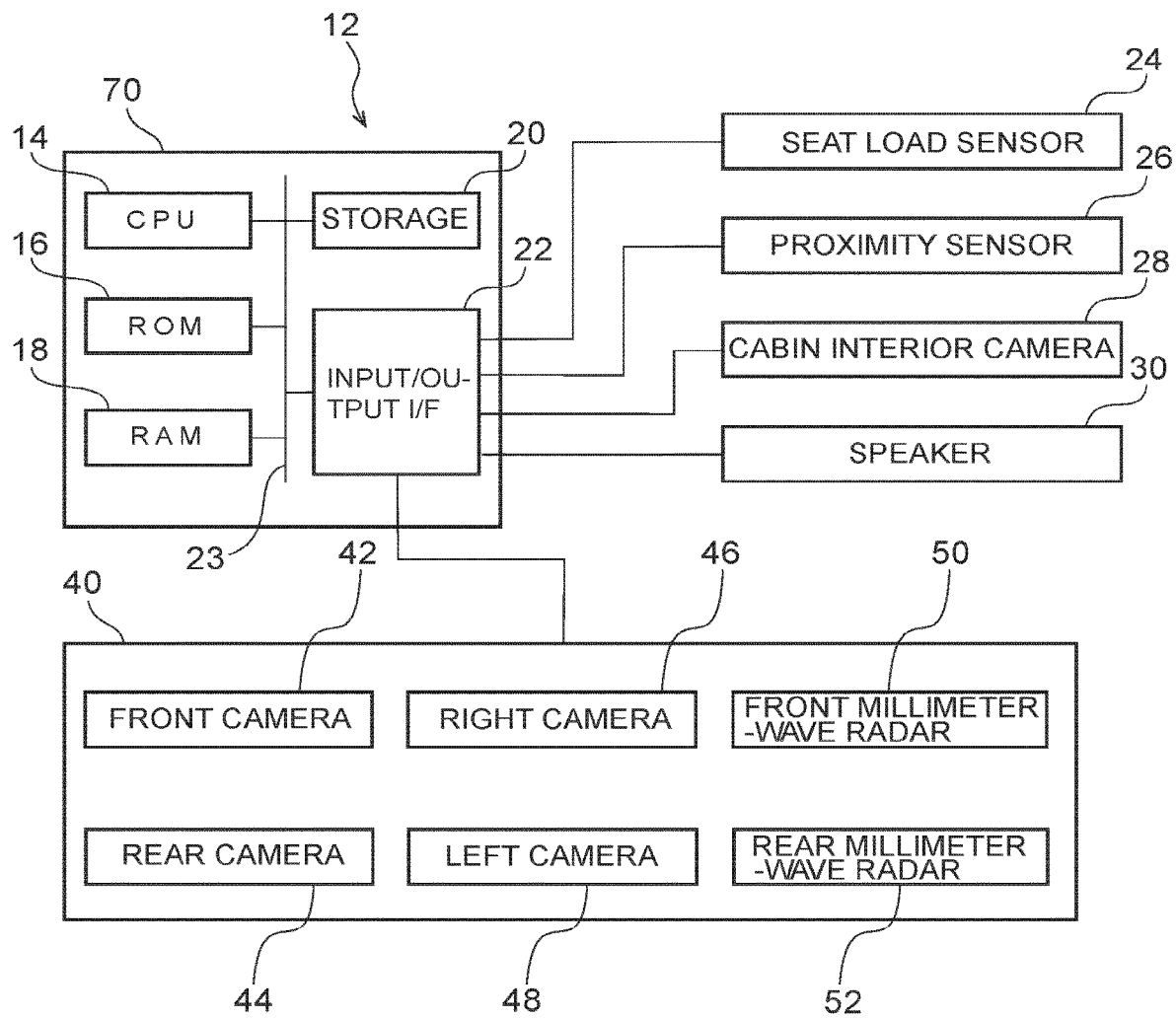
FIG. 1 is a block diagram illustrating a hardware configuration of a vehicle according to a first exemplary embodiment.

As illustrated in FIG. 1, a vehicle 12 of the present exemplary embodiment is provided with the disembarkation action determination device 10. The disembarkation action determination device 10 is a device for determining whether or not a disembarkation action has been initiated inside the cabin of the vehicle 12, and is for example configured by an electronic control unit (ECU) installed in the vehicle 12.

The disembarkation action determination device 10 is configured including a central processing unit (CPU: a processor) 14, read only memory (ROM) 16, random access memory (RAM) 18, storage 20, and an input/output interface 22. The respective configurations are connected so as to be capable of communicating with each other through an internal bus 23.

The CPU 14 is a central processing unit that executes various programs and controls various sections. Namely, the CPU 14 reads a program from the ROM 16 or the storage 20, and executes the program using the RAM 18 as a workspace. The CPU 14 also controls the respective configurations and performs various arithmetic processing according to the program recorded in the ROM 16 or the storage 20.

The ROM 16 holds various programs and various data. The RAM 18 acts as a workspace to temporarily store programs or data. The storage 20 is configured by a hard disk drive (HDD) or a solid state drive (SSD), and is a non-transitory storage medium that holds various programs including an operating system, as well as various data. In the present exemplary embodiment, a program for performing disembarkation action determination processing and the like is held in the ROM 16 or the storage 20.

Note that the input/output interface 22 is electrically connected to a driving support ECU 40. Similarly to the disembarkation action determination device 10, the driving support ECU 40 is configured including a CPU, ROM, RAM, storage, input/output interface, and the like, not illustrated in the drawings. The driving support ECU 40 includes a front camera 42, a rear camera 44, a right camera 46, a left camera 48, a front millimeter-wave radar 50, and a rear millimeter-wave radar 52, respectively serving as obstacle detection sections.

The front camera 42 is for example provided to a front section of the vehicle 12 so as to face ahead from the vehicle, and images ahead of the vehicle. The rear camera 44 is for example provided to a rear section of the vehicle 12 so as to face rearward from the vehicle, and images rearward of the vehicle.

The right camera 46 is for example provided to a right door mirror so as to face rearward from the vehicle, and images toward the rear-right of the vehicle. The left camera 48 is for example provided to a left door mirror so as to face rearward from the vehicle, and images toward the rear-left of the vehicle.

The front millimeter-wave radar 50 is for example provided to the front section of the vehicle 12 so as to detect obstacles ahead of the vehicle. The rear millimeter-wave radar 52 is for example provided to the rear section of the vehicle 12 so as to detect obstacles behind the vehicle.

The disembarkation action determination device 10 acquires information regarding the vehicle surroundings as detected by the above-described sensor types configuring the driving support ECU 40.

The input/output interface 22 of the disembarkation action determination device 10 is also electrically connected to seat load sensors 24, proximity sensors 26, a cabin interior camera 28, and a speaker 30 serving as a reporting unit.

The seat load sensors 24 are provided inside seat cushions configuring respective vehicle seats, and are configured so as to output a load distribution on the corresponding seat cushion when an occupant is sitting on the vehicle seat.

The proximity sensors 26 are provided peripherally to respective door inside handles. The door inside handles are provided on vehicle cabin inner sides of respective side doors. An occupant is able to open the corresponding side door by for example gripping and pulling the door inside handle toward themselves. Note that as an example, an electrostatic capacitance-type proximity sensor that detects the presence of an object based on changes in electrostatic capacitance is employed as the proximity sensor 26 of the present exemplary embodiment.

The cabin interior camera 28 is a camera that images the vehicle cabin interior, and as an example is configured to be capable of detecting occupants seated in front seats and rear seats of the vehicle in the present exemplary embodiment.

The speaker 30 is provided inside the vehicle cabin and outputs predetermined audio to occupants seated in the vehicle seats so as to perform various notification to the occupants.

Functional Configuration of Disembarkation Action Determination Device 10

The disembarkation action determination device 10 implements various functionality using the above-described hardware resources. Explanation follows regarding functional configuration implemented by the disembarkation action determination device 10, with reference to FIG. 2.

Figure 2:
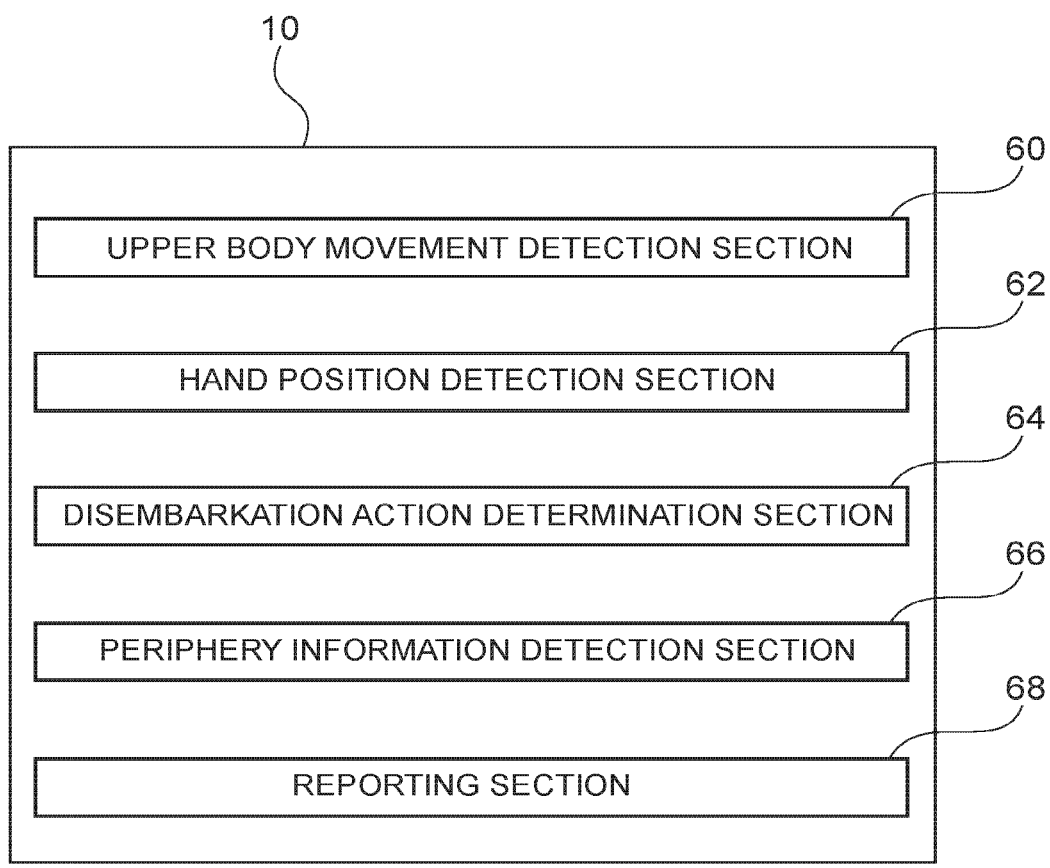
FIG. 2 is a block diagram illustrating a functional configuration of a disembarkation action determination device according to the first exemplary embodiment.

As illustrated in FIG. 2, the disembarkation action determination device 10 includes as functional configuration an upper body movement detection section 60, a hand position detection section 62, a disembarkation action determination section 64, a surroundings information detection section 66, and a reporting section 68. The respective functional configuration is implemented by the CPU 14 reading and executing a program.

The upper body movement detection section 60 detects for a first state in which the upper body of an occupant seated in a vehicle seat has been lifted upright, based on a signal from the corresponding seat load sensor 24 provided in the vehicle cabin. Specifically, the upper body movement detection section 60 detects when the load distribution acquired from the seat load sensor 24 changes from a load distribution corresponding to a relaxed posture adopted during normal vehicle travel to a load distribution corresponding to a posture in which the upper body is upright (the first state).

As an example, the relaxed posture corresponds to a state in which the body of the occupant is supported by the seatback, such that the overall load distribution acquired by the seat load sensor 24 is a small load. In contrast thereto, in the first state in which the occupant has lifted their upper body upright, the body of the occupant moves away from the seatback, such that the load acting on the seat cushion increases. Thus, the overall load distribution acquired by the seat load sensor 24 is larger than the load when in the relaxed posture. The load is particularly large at the position of the ischium of the hip bone when in the first state, thus enabling detection of the relaxed posture or the first state to be made based on the load distribution. Note that the first state may be detected using a learnt model in which load distribution data and posture data have been learnt as training data.

The hand position detection section 62 detects for a second state in which the hand of the occupant seated in the vehicle seat is in proximity to or contacting the door inside handle, based on a signal from the corresponding proximity sensor 26. Specifically, the hand position detection section 62 detects the second state in which the hand of the occupant is in proximity to or contacting the door inside handle in response to output from the proximity sensor 26 when the hand of the occupant is in proximity to or contacting the door inside handle.

In cases in which the first state has been detected by the upper body movement detection section 60 and the second state has been detected by the hand position detection section 62, the disembarkation action determination section 64 determines that the occupant has initiated a disembarkation action. In particular, as an example, the disembarkation action determination section 64 of the present exemplary embodiment determines that the occupant has initiated a disembarkation action in cases in which the first state has been detected by the upper body movement detection section 60, and the second state is then detected by the hand position detection section 62 after a predetermined duration has elapsed.

The disembarkation action determination section 64 therefore does not determine a disembarkation action to have been initiated in cases in which, for example, the occupant operates a switch to lock the door, a switch to open or close a side window, or the like provided peripherally to the door inside handle while in the relaxed posture before lifting their upper body upright, thereby adopting the first state.

In cases in which the disembarkation action determination section 64 has determined that the occupant has initiated a disembarkation action, and an obstacle has been detected in the vehicle surroundings based on a signal from the driving support ECU 40, the reporting section 68 uses the speaker 30 to warn the occupant. Note that instead of, or in addition to, notifying the occupant by audio via the speaker 30, the reporting section 68 may warn using a display performed on a monitor provided inside the vehicle cabin.

Operation

Next, explanation follows regarding operation of the present exemplary embodiment.

Example of Disembarkation Action Determination Processing

Figure 3:
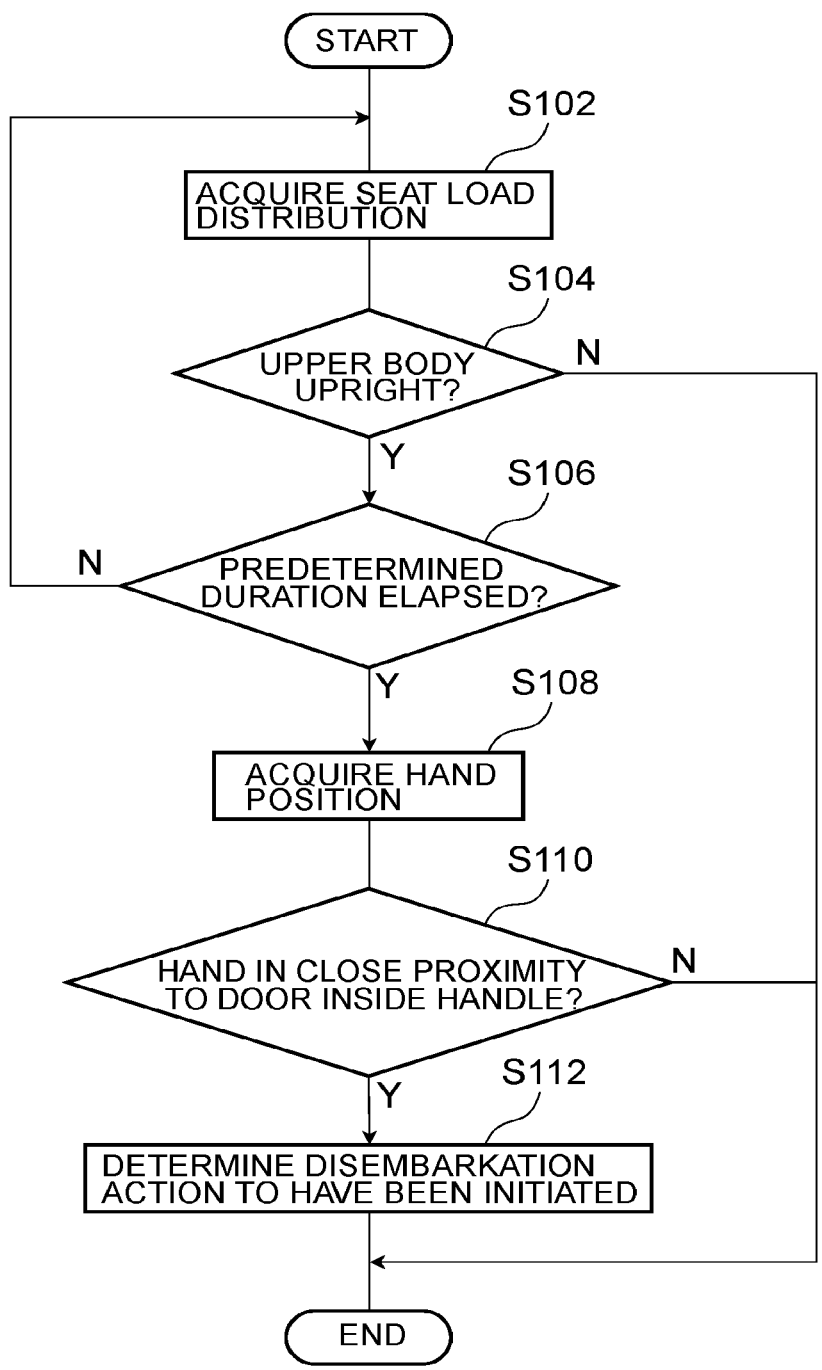
FIG. 3 is a flowchart illustrating an example of a flow of disembarkation action determination processing according to the first exemplary embodiment.

FIG. 3 is a flowchart illustrating an example of a flow of disembarkation action determination processing by the CPU 14 of the disembarkation action determination device 10. This disembarkation action determination processing is executed by the CPU 14 reading a program and expanding and executing the program in the RAM 18 or the like. As an example, in the present exemplary embodiment, execution of the disembarkation action determination processing is initiated when the vehicle speed of the vehicle 12 becomes zero, and the disembarkation action determination processing is then repeatedly executed on a predetermined cycle. Namely, the disembarkation action determination processing is not performed while the vehicle 12 is traveling.

As illustrated in FIG. 3, at step S102, the CPU 14 acquires the seat load distribution. Specifically, the CPU 14 acquires seat load distribution data for the vehicle seats as detected by the seat load sensors 24.

At step S104, the CPU 14 determines whether or not an occupant is in the first state in which their upper body has been lifted upright. Specifically, in cases in which the CPU 14 has detected using the functionality of the upper body movement detection section 60 that the load distribution has changed to a load distribution corresponding to the first state, affirmative determination is made at step S104 and processing transitions to step S106.

In cases in which the first state is not detected at step S104, negative determination is made at step S104, and the CPU 14 ends the disembarkation action determination processing.

At step S106, the CPU 14 determines whether or not a predetermined duration has elapsed. Specifically, the CPU 14 starts a timer at the point in time at which the first state is detected, and determines whether or not the predetermined duration has elapsed based on this timer. This predetermined duration referred to here is set as a duration between the occupant adopting the first state by lifting their upper body upright and adopting the second state in which their hand is in proximity to the door inside handle. In other words, since the first state and the second state should not be adopted at the same time, a duration in the region of several milliseconds to several seconds may be set as the predetermined duration.

In cases in which the CPU 14 determines that the predetermined duration has elapsed at step S106, affirmative determination is made at step S106 and processing transitions to step S108. In cases in which the CPU 14 determines that the predetermined duration has not elapsed at step S106, negative determination is made at step S106 and processing returns to step S102.

At step S108, the CPU 14 acquires a hand position of the occupant. Specifically, the CPU 14 uses the functionality of the hand position detection section 62 to acquire a signal from the corresponding proximity sensor 26.

Next, at step S110, the CPU 14 determines whether or not the hand of the occupant is in proximity to the door inside handle. Note that the CPU 14 also determines that the hand of the occupant is in proximity to the door inside handle in cases in which the hand is physically contacting the door inside handle.

In cases in which the CPU 14 determines that the hand of the occupant is in proximity to the door inside handle at step S110 based on the signal from the proximity sensor 26, affirmative determination is made at step S110, and processing transitions to step S112. In cases in which the CPU 14 does not determine that the hand of the occupant is in proximity to the door inside handle at step S110, negative determination is made at step S110, and the disembarkation action determination processing is ended.

At step S112, the CPU 14 determines that a disembarkation action has been initiated. The CPU 14 then ends the disembarkation action determination processing.

As described above, in the disembarkation action determination device 10 of the present exemplary embodiment, the disembarkation action determination section 64 determines that the occupant has initiated a disembarkation action in cases in which the first state and the second state have been detected. This enables the disembarkation action of the occupant to be detected prior to the occupant opening the door.

Moreover, the disembarkation action determination section 64 does not determine that a disembarkation action has been initiated until both the first state and the second state have been detected, thereby enabling warnings at unnecessary timings, such as when the vehicle has simply stopped, to be suppressed.

In the present exemplary embodiment, a disembarkation action is not determined to have been initiated in cases in which the first state and the second state are detected at the same time. It is known that when disembarking, occupants will often touch the door inside handle with their hand after first lifting their upper body upright. Thus, basing determination that a disembarkation action has been initiated on the flowchart illustrated in FIG. 3 enables instances of mistaken determination to be reduced.

Furthermore, in the present exemplary embodiment, the disembarkation action determination processing is only performed once the vehicle speed has become zero. Taking the vehicle speed into consideration in this manner enables determination that a disembarkation action has been initiated to be made more accurately. Moreover, the processing burden on the CPU 14 can be reduced in comparison to configurations in which determination regarding a disembarkation action is being performed at all times.

Moreover, in the present exemplary embodiment, detection that the upper body is upright is made based on load distribution, using the seat load sensors 24. This enables detection of the first state to be made in for example cases in which the load distribution has changed from a load distribution corresponding to a relaxed posture to a load distribution corresponding to a posture in which the upper body has been lifted upright.

Furthermore, in the present exemplary embodiment, detection of the second state is based on signals from the proximity sensors 26 provided peripherally to the door inside handles, thereby enabling the second state to be more accurately detected than in configurations in which sensing is performed from a position some distance from the door inside handle.

Furthermore, in the present exemplary embodiment, in cases in which an occupant is determined to have initiated a disembarkation action and an obstacle has been detected in the vehicle surroundings, a predetermined notification is made to the occupant using the speaker 30, thereby enabling the occupant to be warned prior to the occupant opening the door.

Second Exemplary Embodiment

Next, explanation follows regarding a disembarkation action determination device 70 according to a second exemplary embodiment, with reference to the drawings. Note that similar configuration to that in the first exemplary embodiment is appended the same reference numerals, and explanation thereof is omitted where appropriate.

Figure 4:
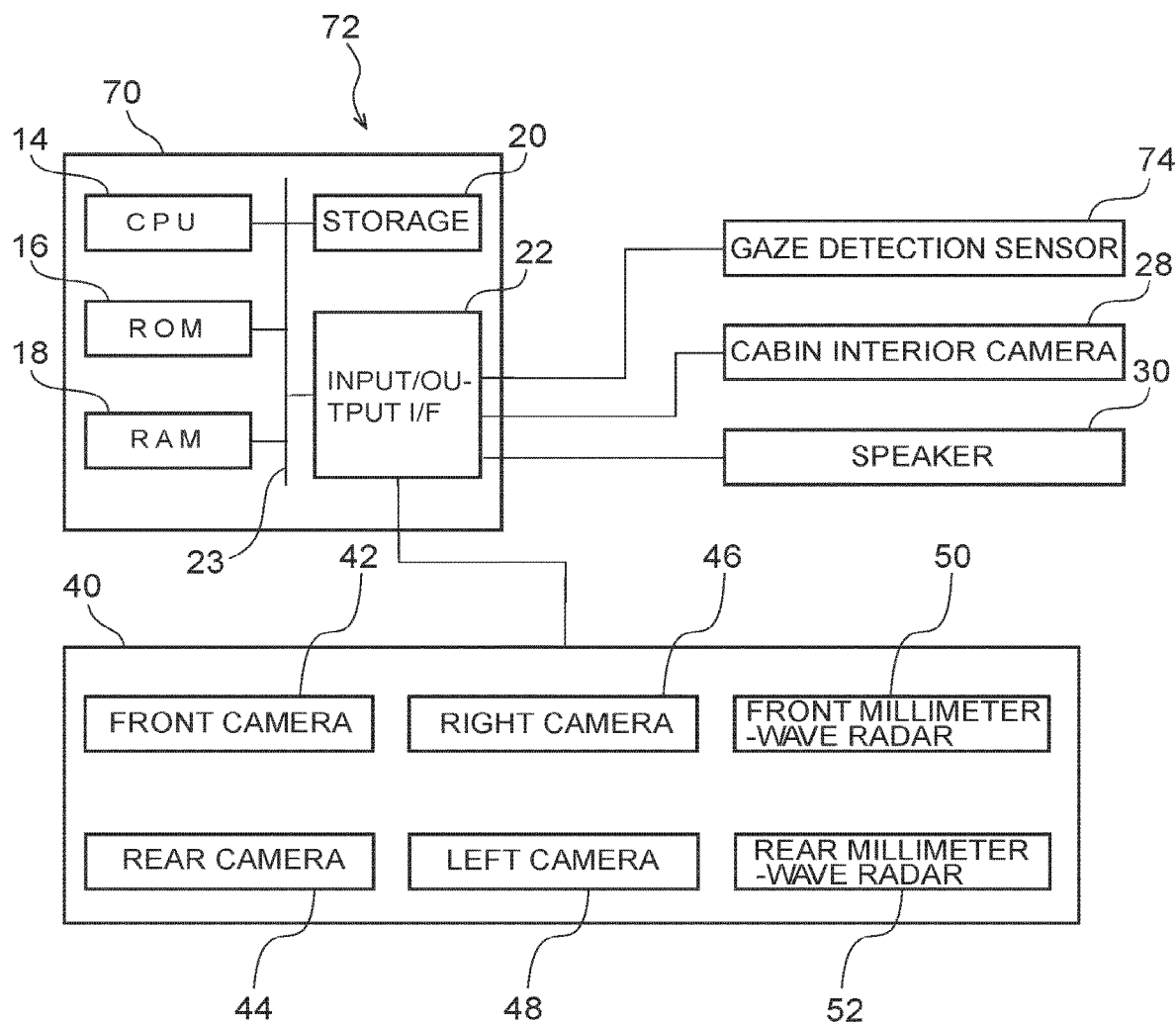
FIG. 4 is a block diagram illustrating a hardware configuration of a vehicle according to a second exemplary embodiment.

As illustrated in FIG. 4, a vehicle 72 of the present exemplary embodiment is provided with the disembarkation action determination device 70. The input/output interface 22 configuring the disembarkation action determination device 70 is electrically connected to gaze detection sensors 74, the cabin interior camera 28, and the speaker 30. Note that the present exemplary embodiment differs to the first exemplary embodiment in that the gaze detection sensors 74 are provided instead of the seat load sensors 24 and the proximity sensors 26.

The gaze detection sensors 74 are sensors for detecting the gaze direction of an occupant. For example, a gaze detection sensor 74 that detects the gaze direction of the occupant sitting on a driving seat is provided to an instrument panel in front of the driving seat. The gaze direction is computed by for example detecting the position of the pupils of the occupant sitting on the driving seat. Other hardware configuration is similar to that in the first exemplary embodiment.

Functional Configuration of Disembarkation Action Determination Device 70

The disembarkation action determination device 70 implements various functionality using the hardware resources illustrated in FIG. 4. Explanation follows regarding functional configuration implemented by the disembarkation action determination device 70, with reference to FIG. 5.

Figure 5:
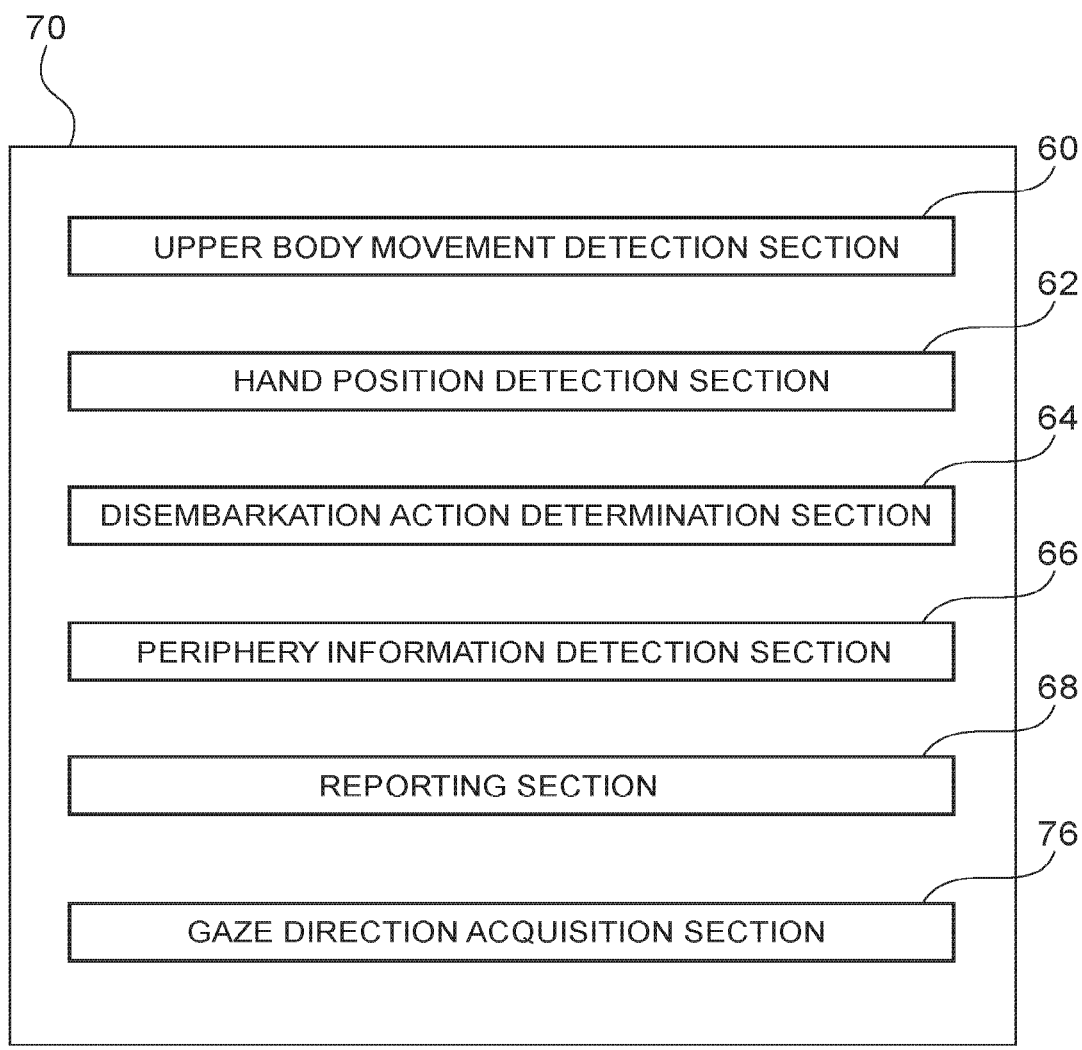
FIG. 5 is a block diagram illustrating a functional configuration of a disembarkation action determination device according to the second exemplary embodiment.

As illustrated in FIG. 5, the disembarkation action determination device 70 is configured including as functional configuration the upper body movement detection section 60, the hand position detection section 62, the disembarkation action determination section 64, the surroundings information detection section 66, the reporting section 68, and a gaze direction acquisition section 76. The respective functional configuration is implemented by the CPU 14 reading and executing a program.

Note that the upper body movement detection section 60 and the hand position detection section 62 of the present exemplary embodiment have different functionality to those in the first exemplary embodiment. Moreover, the gaze direction acquisition section 76 is included in the present exemplary embodiment.

The upper body movement detection section 60 detects for a first state in which an occupant seated in a vehicle seat has lifted their upper body upright, based on a signal from the cabin interior camera 28 provided in the vehicle cabin. Specifically, the upper body movement detection section 60 computes a position of the upper body from an image of the occupant captured by the cabin interior camera 28, and detects that the occupant has entered the first state in cases in which the position of their upper body has moved as far as a predetermined position toward the vehicle front side. Thus, a camera well-suited to measuring distances, such as a time of flight (TOF) camera, may be employed as the cabin interior camera 28 of the present exemplary embodiment.

The hand position detection section 62 detects for a second state in which the hand of the occupant seated in the vehicle seat is in proximity to or contacting the door inside handle, based on a signal from the cabin interior camera 28. Specifically, the hand position detection section 62 extracts a portion including the hand from an image of the occupant captured by the cabin interior camera 28 and computes the distance between the position of the hand and the door inside handle. The second state is detected in cases in which the distance between the computed position of the hand of the occupant and the door inside handle is a predetermined distance or less. Thus, in the present exemplary embodiment, images of occupants captured by the cabin interior camera 28 are employed by both the upper body movement detection section 60 and the hand position detection section 62.

The gaze direction acquisition section 76 acquires the gaze direction of the occupant based on a signal from the corresponding gaze detection sensor 74. Specifically, by acquiring the gaze of the occupant, the gaze direction acquisition section 76 identifies the object of the gaze, namely what the occupant is looking at.

The disembarkation action determination section 64 of the present exemplary embodiment makes a determination regarding a disembarkation action in consideration of signals from the upper body movement detection section 60 and the hand position detection section 62, as well as the gaze direction of the occupant as acquired by the gaze direction acquisition section 76.

Operation

Next, explanation follows regarding operation of the present exemplary embodiment.

Example of Disembarkation Action Determination Processing

FIG. 6 is a flowchart illustrating an example of a flow of disembarkation action determination processing by the CPU 14 of the disembarkation action determination device 70. This disembarkation action determination processing is executed by the CPU 14 reading a program and expanding and executing the program in the RAM 18 or the like. As an example, in the present exemplary embodiment, the disembarkation action determination processing is initiated when the vehicle speed of the vehicle 12 becomes zero, and the disembarkation action determination processing is then repeatedly executed on a predetermined cycle. Namely, the disembarkation action determination processing is not performed while the vehicle 12 is traveling.

As illustrated in FIG. 6, at step S202, the CPU 14 acquires the position of the upper body of an occupant. Specifically, the CPU 14 uses the functionality of the upper body movement detection section 60 to compute the upper body position of the occupant based on a signal from the cabin interior camera 28.

At step S204, the CPU 14 determines whether or not the occupant has lifted their upper body upright. Specifically, in cases in which the CPU 14 has detected the first state in which the upper body of the occupant sitting on the vehicle seat is upright based on a signal from the cabin interior camera 28 provided inside the vehicle cabin using the functionality of the upper body movement detection section 60, affirmative determination is made at step S204, and processing transitions to step S206.

In cases in which the first state has not been detected at step S204, negative determination is made at step S204, and the CPU 14 ends the disembarkation action determination processing.

At step S206, the CPU 14 determines whether or not a predetermined duration has elapsed. Specifically, the CPU 14 starts a timer at the point in time at which the first state is detected, and determines whether or not the predetermined duration has elapsed based on this timer.

In cases in which the CPU 14 determines that the predetermined duration has elapsed at step S206, affirmative determination is made at step S206 and processing transitions to step S208. In cases in which the CPU 14 determines that the predetermined duration has not elapsed at step S206, negative determination is made at step S206 and processing returns to step S202.

At step S208, the CPU 14 acquires the hand position and the gaze direction of the occupant. Specifically, the CPU 14 extracts a portion including the hand of the occupant from an image captured by the cabin interior camera 28. The CPU 14 also uses the functionality of the gaze direction acquisition section 76 to acquire the gaze direction of the occupant based on a signal from the gaze detection sensor 74.

Next, at step S210, the CPU 14 determines whether or not the gaze direction of the occupant is directed toward the door inside handle. Specifically, in cases in which the gaze direction of the occupant as acquired by the gaze direction acquisition section 76 is directed toward the door inside handle or the vicinity of the door inside handle, the CPU 14 makes an affirmative determination at step S210, and processing transitions to step S212.

In cases in which the CPU 14 determines that the gaze direction of the occupant is not directed toward the door inside handle at step S210, negative determination is made at step S210 and the disembarkation action determination processing is ended.

At step S212, the CPU 14 determines whether or not the hand of the occupant is in proximity to the door inside handle. Specifically, in cases in which the distance between the position of the hand of the occupant captured by the cabin interior camera 28 and the door inside handle is computed to be the predetermined distance or less using the functionality of the hand position detection section 62, the CPU 14 makes an affirmative determination at step S212, and processing transitions to step S214.

On the other hand, in cases in which the CPU 14 determines that the distance between the position of the hand of the occupant and the door inside handle is greater than the predetermined distance at step S212, negative determination is made at step S212, and the disembarkation action determination processing is ended.

At step S214, the CPU 14 determines that a disembarkation action has been initiated. The CPU 14 then ends the disembarkation action determination processing.

As described above, in the disembarkation action determination device 70 according to the present exemplary embodiment, the first state and the second state are detected based on images of the occupant captured by the camera, thereby enabling a disembarkation action of the occupant to be determined without employing other types of sensor.

Moreover, in the present exemplary embodiment, determination that a disembarkation action has been initiated is only made in cases in which the gaze direction of the occupant is directed toward the door inside handle, thereby enabling instances of mistaken determination to be reduced in comparison to configurations in which the gaze direction is not detected. Other operation is similar to that in the first exemplary embodiment.

Although the disembarkation action determination devices 10, 70 according to the first exemplary embodiment and second exemplary embodiment have been described above, obviously various other implementations are possible within a range not departing from the spirit of the present disclosure. For example, although the disembarkation action determination processing is executed when the vehicle speed of the vehicle 12 has become zero in the above exemplary embodiments, there is no limitation thereto. The disembarkation action determination processing may be executed cyclically, starting directly after the vehicle 12 has been started up.

Moreover, although detection for the second state is performed after a predetermined duration has elapsed following detection of the first state in the above exemplary embodiments, there is no limitation thereto. For example, determination that a disembarkation action has been initiated may also be made in cases in which the first state and the second state are detected at the same time. Moreover, determination that a disembarkation action has been initiated may also be made in cases in which the first state is detected after the second state has been detected. Such methods of determination enable determination to be made in cases in which an irregular disembarkation action is performed. However, from the perspective of suppressing mistaken determination, detection for the second state is preferably performed after a predetermined duration has elapsed since detection of the first state.

Furthermore, although in the first exemplary embodiment the upper body movement detection section 60 detects for the first state in which the upper body of the occupant sitting on the vehicle seat is upright based on a signal from the corresponding seat load sensor 24 provided inside the vehicle cabin, there is no limitation thereto. For example, a proximity sensor such as an infrared sensor may be provided in the seatback, and the detection of the first state may be performed based on a signal from this proximity sensor. In such cases, the upper body movement detection section 60 may detect the distance between the body (back) of the occupant and the seatback using this proximity sensor, and detect the first state in cases in which the body of the occupant is separated from the seatback by a predetermined distance or greater. Alternatively detection of the first state may be performed using both a proximity sensor provided in the seatback and the seat load sensor 24.

Furthermore, although an image of the occupant captured by the cabin interior camera 28 is employed by both the upper body movement detection section 60 and the hand position detection section 62 in the second exemplary embodiment, there is no limitation thereto. Namely, the upper body movement detection section 60 and the hand position detection section 62 may employ the seat load sensor 24 and the proximity sensor 26 similarly to in the first exemplary embodiment.

Moreover, although the disembarkation action determination section 64 determines that a disembarkation action has been initiated in cases in which the gaze direction of the occupant is directed toward the door inside handle in the second exemplary embodiment, there is no limitation thereto. For example, at step S210 in FIG. 6, the CPU 14 may make an affirmative determination in cases in which the gaze direction of the occupant as acquired by the gaze direction acquisition section 76 is facing more toward a vehicle width direction outer side than straight in front of the occupant (toward the vehicle front side). When disembarking, the gaze direction of the occupant is unconsciously directed toward the vehicle width direction outside, namely toward the view outside the side door. Thus, determining that a disembarkation action has been initiated in cases in which the gaze direction of the occupant is directed more toward the vehicle width direction outer side than the vehicle front side enables the likelihood of irregular disembarkation actions being detected to be increased.

Furthermore, in the exemplary embodiments described above, the occupant is warned using the speaker 30 in cases in which the disembarkation action determination section 64 has determined that the occupant has initiated a disembarkation action and an obstacle has been detected in the vehicle surroundings using a signal from the driving support ECU 40. However, other processing may also be implemented in addition thereto. For example, configuration may be made such that the side door remains engaged with the vehicle body even if the occupant operates the door inside handle in cases in which an obstacle has been detected in the vehicle surroundings. Namely, in a configuration in which the door is automatically locked in cases in which an obstacle has been detected in the vehicle surroundings, it may be difficult for the occupant to ascertain the reason why the door has been locked. However, warning the occupant prior to opening the door as in the above exemplary embodiments would enable the occupant to ascertain the reason why they are unable to open the side door.

Furthermore, the processing executed by the CPU 14 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The disembarkation action determination processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although the ROM 16 and the storage 20 are configured by non-transitory recording media serving as memory in the above exemplary embodiments, there is no limitation thereto. For example, a compact disc (CD), a digital versatile disc (DVD), or universal serial bus (USB) memory may be employed as a non-transitory storage medium. In such cases, various programs may be held in the recording medium.

What is claimed is:

1. A disembarkation action determination device, comprising a processor, wherein the processor is configured to:
   detect for a first state in which an upper body of an occupant sitting on a vehicle seat has been lifted upright, based on a signal from a first sensor provided inside a vehicle cabin;
   detect for a second state in which a hand of the occupant sitting on the vehicle seat is in proximity to or contacting a door inside handle, based on a signal either from the first sensor or from a second sensor separate from the first sensor; and
   determine the occupant to have initiated a disembarkation action in cases in which the first state has been detected and the second state has been detected,
   wherein the processor is further configured to determine that the occupant has initiated the disembarkation action in cases in which the second state has been detected after a predetermined duration has elapsed following detection of the first state.

2. The disembarkation action determination device of claim 1, wherein the processor is further configured to perform the determination regarding initiation of a disembarkation action in cases in which a vehicle speed of the vehicle has become zero.

3. The disembarkation action determination device of claim 1, wherein the processor is further configured to:
   acquire a gaze direction of the occupant; and
   determine the occupant to have initiated the disembarkation action in cases in which the first state and the second state have been detected, and the gaze direction of the occupant has been detected to be directed toward the door inside handle.

4. The disembarkation action determination device of claim 1, wherein the processor is further configured to detect for the first state based on load distribution using a seat load sensor serving as the first sensor and installed at the vehicle seat.

5. The disembarkation action determination device of claim 1, wherein the processor is further configured to detect for the second state based on a signal from a proximity sensor serving as the second sensor and provided peripherally to the door inside handle.

6. The disembarkation action determination device of claim 1, wherein the processor is further configured to detect for the first state and the second state based on an image of the occupant captured by an in-cabin camera serving as the first sensor.

7. A vehicle, comprising the disembarkation action determination device of claim 1.

8. The vehicle of claim 7, further comprising:
   an obstacle detection section configured to detect for obstacles in a periphery of the vehicle; and
   a reporting unit configured to issue a notification to the occupant,
   wherein a predetermined notification is issued to the occupant by the reporting unit in cases in which determination has been made that the occupant has initiated a disembarkation action and an obstacle has been detected in the vehicle periphery by the obstacle detection section.

9. A disembarkation action determination method, comprising, by a processor:
   detecting for a first state in which an upper body of an occupant sitting on a vehicle seat has been lifted upright, based on a signal from a first sensor provided inside a vehicle cabin;

detecting for a second state in which a hand of the occupant sitting on the vehicle seat is in proximity to or contacting a door inside handle, based on a signal either from the first sensor or from a second sensor separate from the first sensor;

determining the occupant to have initiated a disembarkation action in cases in which the first state has been detected and the second state has been detected; and determining that the occupant has initiated the disembarkation action in cases in which the second state has been detected after a predetermined duration has elapsed following detection of the first state.

10. A non-transitory storage medium storing a program executable by a computer to perform processing, the processing comprising:

detecting for a first state in which an upper body of an occupant sitting on a vehicle seat has been lifted upright, based on a signal from a first sensor provided inside a vehicle cabin;

detecting for a second state in which a hand of the occupant sitting on the vehicle seat is in proximity to or contacting a door inside handle, based on a signal either from the first sensor or from a second sensor separate from the first sensor; and determining the occupant to have initiated a disembarkation action in cases in which the first state has been detected and the second state has been detected; and determining that the occupant has initiated the disembarkation action in cases in which the second state has been detected after a predetermined duration has elapsed following detection of the first state.

* * * * *